United States Patent [19]

Jacquemin

[11] Patent Number: 6,098,940
[45] Date of Patent: Aug. 8, 2000

[54] DEVICE FOR SCREWLESS MOUNTING OF AN ACCESSORY

[75] Inventor: Didier Jacquemin, Luxeuil les Bains, France

[73] Assignee: Becker Group Europe GmbH, Wuppertal, Germany

[21] Appl. No.: 09/070,279

[22] Filed: Apr. 30, 1998

[30] Foreign Application Priority Data

May 2, 1997 [DE] Germany .......................... 197 18 508

[51] Int. Cl.[7] .......................... A47B 96/06; A47G 29/00; A47K 1/00; E04G 3/00; F21V 21/00
[52] U.S. Cl. .............................. 248/220.21; 248/220.31; 248/222.51; 411/344
[58] Field of Search .................... 248/220.31, 220.21, 248/221.11, 222.51, 224.8; 411/340, 344, 345; 403/322.1, 322.4

[56] References Cited

U.S. PATENT DOCUMENTS

| 4,103,854 | 8/1978 | Pliml et al. ........................ 248/222.51 |
| 4,728,068 | 3/1988 | Rivkin ................................ 248/220.31 |
| 4,913,484 | 4/1990 | Dowd et al. . |
| 5,228,816 | 7/1993 | Boville .................................... 411/340 |
| 5,314,227 | 5/1994 | Weiland et al. ..................... 248/289.1 |
| 5,403,064 | 4/1995 | Mahler et al. .......................... 411/344 |
| 5,560,669 | 10/1996 | Gute ......................................... 411/344 |
| 5,636,891 | 6/1997 | Van Order et al. .................. 248/224.8 |
| 5,775,861 | 7/1998 | Leon et al. ............................... 411/344 |
| 5,794,901 | 8/1998 | Sigel .................................... 248/221.11 |

FOREIGN PATENT DOCUMENTS 197 18 509  4/1998  Germany .
WO 96/17178 6/1996 WIPO .

*Primary Examiner*—Ramon O. Ramirez
*Assistant Examiner*—Jerome A. DeLuca
*Attorney, Agent, or Firm*—Harness, Dickey & Pierce, P.L.C.

[57] ABSTRACT

A device is provided for the screwless mounting of at least one accessory in a cutout of a vehicle support structure. The screwless mounting device includes a locking element, a base body, a connecting device and a fastening element which can be moved between an insertion position and a fastening position. In the insertion position, the locking element and the fastening element can be pushed through the recess of the accessory until the base body rests against the visible side of the accessory. In the fastening position, the fastening element can be brought to rest against the back of the accessory in order to fix the device in place in the accessory. The connecting device is provided between the fastening element and the base body for the selective fixation of the fastening element in the fastened position.

20 Claims, 2 Drawing Sheets

DEVICE FOR SCREWLESS MOUNTING OF AN ACCESSORY

FIELD OF THE INVENTION

The invention relates to a device for the screwless mounting of at least one accessory on a vehicle support structure having a cutout for mounting, in particular the headliner on the automotive body sheet metal of a motor vehicle, with a locking element formed thereon, and at least one base body having a fastening element which can be moved between an insertion position and a fastening position, wherein the locking elements and the fastening elements can be pushed through the recess of the base body until the latter rests against the visible side of the accessory, and in the fastening position the fastening element can be brought to rest against the back of the accessory in order to fix the device in place in the accessory.

BACKGROUND OF THE INVENTION

In connection with a device of this kind known from International Patent Publication WO 96/17178, laterally resiliently projecting fastening elements in the form of rods have been formed in the connecting area on the two locking elements which are connected with each other, which can be pushed, together with the locking elements, through the recess of a headliner constituting the accessory, are pressed together in the process and are only resiliently spread open after having passed through the recess and are supported on the back of the accessory. It is possible in this way to pre-fasten the device on the accessory before the accessory, together with the device pre-fastened on it, is fastened to the vehicle support structure in a final mounting step. The prefastening is not secure, since it depends on the resilience of the relatively long fastening elements, which only act in spots. Furthermore, the spread fastening elements which clutch the accessory can hamper the insertion of the locking elements into the cutout of the vehicle support structure during final mounting. The device is finally mounted in the vehicle support structure by means of a blocking wedge, which is driven between the locking elements. Since one of the locking elements is not connected with the base body, under a load the base body can be lifted off at one side of the cutout of the support structure.

In connection with a device known from U.S. Letters Pat. No. 4,913,484, a screw connection is required for prefastening the device on a headliner.

OBJECT AND SUMMARY OF THE INVENTION

It is the object of the invention to create a device of the type mentioned at the outset, by means of which it is conveniently possible to achieve a secure fastening of the device in an accessory which is fastened on the support structure, along with the already fastened device, in a final mounting step. Furthermore, the secure seating of the base body on the support structure even under a load should be possible.

This object is attained in accordance with the invention by means of a device for the screwless mounting of at least one accessory on a vehicle support structure having a cutout for mounting, such as the headliner on the automotive body sheets metal of a motor vehicle. The screwless mounting device includes a locking element, a base body, a connecting device and a fastening element which can be moved between an insertion position and a fastening position. In the insertion position, the locking element and the fastening element can be pushed through the recess of the accessory until the base body rests against the visible side of the accessory. In the fastening position, the fastening element can be brought to rest against the back of the accessory in order to fix the device in place in the accessory. The connecting device is provided between the fastening element and the base body for the selective fixation of the fastening element in the fastened position.

The fastening element, which is in the insertion position, can be easily inserted through the recess of the accessory before it is moved manually or by an assembly robot into the fastening position and is fastened on the base body by means of the connecting device. In this way a secure fastening of the device in the accessory is assured which, together with the device, is fixed in place on the support structure during the final mounting. The connection device should be embodied to be at least sturdy enough that it cannot come loose because of vibration caused during transport or mounting. Because the base body rests against the visible side of the accessory, while the fastening element, which is fixed in place, rests against the back, the device is accurately positioned. The fastening element does not interfere with the final mounting of the device.

It is possible to design the shape of the connecting device simply and effectively. The connecting device may include a first connecting element on the fastening element, and a second connecting element on the base body. The first and second connecting elements should be matched to interconnect with each other. If the removal of the device should be required, the connecting device can be released again at any time.

In accordance with an embodiment of the invention wherein the fastening element is a fastening tongue that can be moved via a hinge into the fastening position that is approximately parallel with the base body and the connecting device is arranged spaced apart from the hinge, the fastening element offers little resistance against insertion into the recess of the accessory, because it can be moved with little resistance in the hinge, which may be a film hinge, link, or other type of pivotable hinge-type connection. A fastening tongue makes a secure fastening on the accessory possible. Fastening is achieved with an advantageous lever arm of the fastening tongue.

In accordance with an embodiment of the invention wherein one of the first and second connecting elements is a thickened pin, and the other connecting element is a plier-like clip, an easy-to-handle connecting device, which acts in an interlocking and frictionally connected manner, is achieved.

In accordance with an embodiment of the invention wherein the device includes a flange area having a pocket which fits into the recess, the flange area being provided on the rear of the base body, and a fastening tongue respectively hinged on two oppositely located lateral areas of the flange area wherein the second connecting element is provided in the pocket of the flange area on the base body, the flange area on the base body is used for positioning the device in the recess. Furthermore, the hingeing of the fastening tongue and the connecting device are housed within the flange height, so that they are outside of the accessory after final mounting. This embodiment is furthermore advantageous in shape.

Another embodiment of the invention provides that in the fastening position a free end of the fastening tongue projects past the flange area, and on the side of the flange area located opposite the projecting free end of the fastening tongue, at least one fastening bracket, which is approximately parallel with the base body, is spaced apart from the base body and is fixed in place, projects past the flange area. In this embodiment, for fastening the device, the fastening tongue cooperates with the fastening brackets, which are suitably formed on a side opposite of the flange area. Several fastening tongues can be provided and, if required, the fastening brackets can be omitted. Advantageously, the fastening tongues do not interfere with final mounting, because they can even constitute desirable support surfaces on the support structure.

Fastening can be improved by incorporating at least one cutting strip, extending in the insertion direction between the fastening bracket and the base body, to provide security against twisting.

A further embodiment of the invention provides the hinge spaced at approximately the same distance away from the base body as the connecting device, and provides the fastening tongue with an essentially straight section and a tapered end section adjacent the hinge. This embodiment results in advantageous lever proportions for the fastening tongue as soon as the connecting device holds the fastening tongue.

Another embodiment of the invention provides that the locking element has a free end section separated from the base body, and a detent mechanism between the free end section of the locking element and the base body, by means of which the base body can be coupled in a tension-resistant manner opposite to the insertion direction with the locking element when the device has been mounted on the vehicle support structure. In accordance with this embodiment, by means of the detent mechanism the base body is supported in a tension-resistant manner also in that area of the vehicle support structure, in which the locking element has been purposely separated from the base body in order to assure the mobility of the locking elements required for insertion. This separation is bridged by the detent mechanism during final mounting. Both locking elements are supportive in essentially the same way when a load acts on the base body. The result is an even and advantageously distributed force transfer from the base body to the vehicle support structure.

The detent mechanism is particularly advantageously actuated by means of the blocking wedge, which fixes the locking elements in place on the vehicle support structure and which also assures that the detent mechanism has been correctly actuated and transfers tensile forces from the base body to the support structure. If needed, the detent mechanism is designed in such a way that under the spreading action of the blocking wedge it presses the base body with prestress against the support structure after the locking elements have been correctly locked.

In accordance with another embodiment of the invention, the connecting device for fastening the device and the detent mechanism for the final fixation in place are arranged on different sides of the flange area, so that the individual movable components do not interfere with each other and the space available in the flange area is maximally utilized.

Particularly advantageously, the device is integrally formed as a one piece injection-molded plastic part, for example made of polyamide, which can be produced even on a large scale in a cost-effective manner with exact shaping and an attractive exterior. Optionally, the blocking wedge could be part of the device, but it need not be such.

In a preferred use of the invention, the screwless mounting device is intended for fastening a headliner or a trim plate onto a vehicle support structure. Several of such devices can be used to mount the headliner or trim plate. Each device would be already pre-fastened in the recess of the headliner or in the trim plate prior to mounting into the cutout of the vehicle support structure.

Additionally, the device may be used for fixing a grab handle in place on the support structure, wherein the possibility of fixing it in place on a further accessory is advantageous, and the fastening of the base body, capable of carrying a load, with the bearing block after final mounting is advantageous, in particular in connection with a grab handle which often is subjected to considerable loads.

Furthermore, a grab handle may be fixed in place on the headliner or a trim plate by means of the device, and this device element may then be fixed in place on the support structure. In this manner, previous mounting of the grab handle to the accessory, along with fixing the device in place is possible. In this case, the grab handle should be only considered by way of an example, because in place of a grab handle it would be possible just as well to fix a sun visor, a screen, a mirror or the like by means of the device.

The invention will be explained in more detail by means of the drawings of the preferred embodiments.

DETAILED DESCRIPTION OF THE PREFERRED EMBODIMENTS

Figure 1:
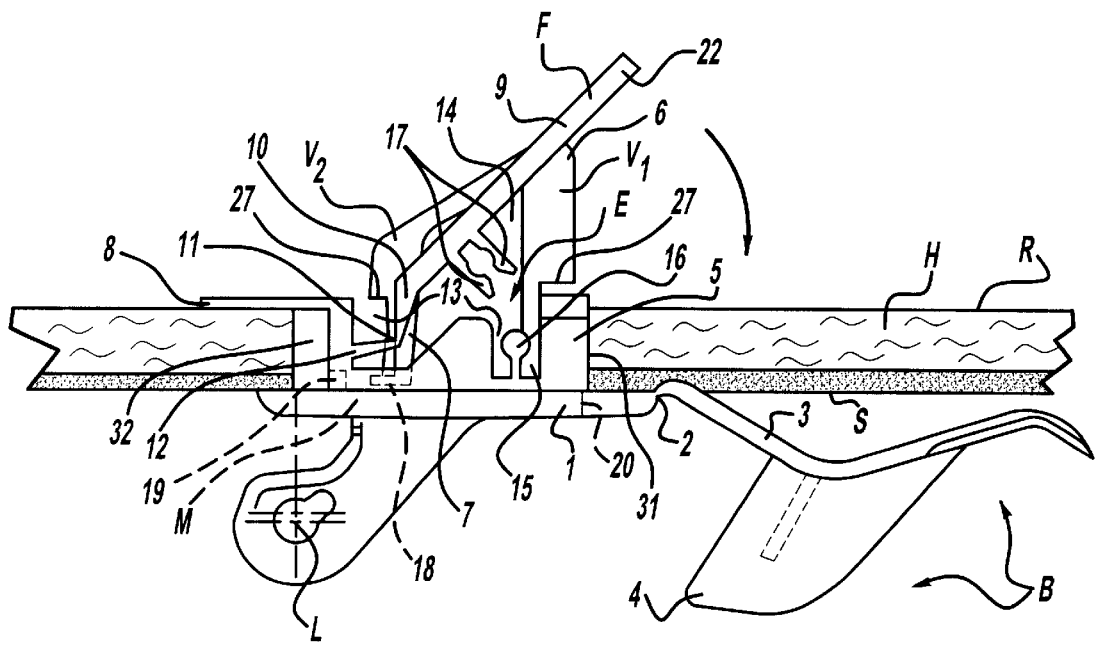
FIG. 1 represents a cross-sectional view of a device to be mounted on an accessory Prior termination of pre-mounting.
Figure 2:
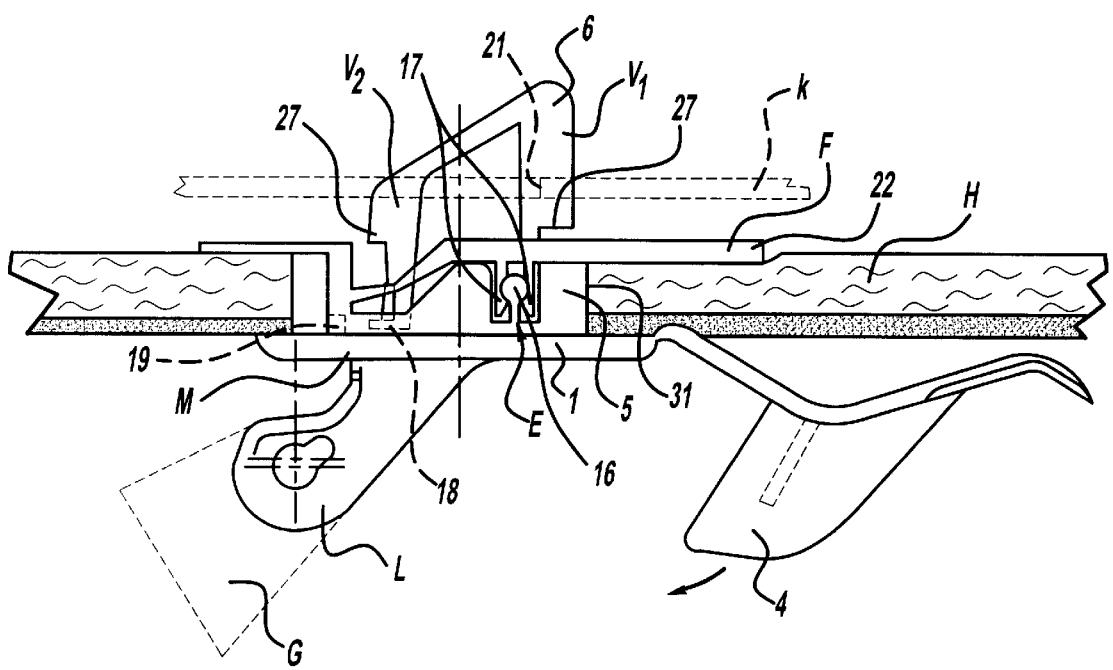
FIG. 2 represents a cross-sectional view of a device similar to the one in FIG. 1 after pre-mounting has been terminated and prior to final mounting.

A device B in accordance with FIGS. 1 and 2 is used for fixing an accessory H in place on a vehicle support structure K (drawn in dashed lines in FIG. 2), in particular during the assembly of a motor vehicle body. The accessory H can be a headliner or a trim plate or the like. As represented, the device B can also be used for fastening another accessory, in this case a grab handle G or the like, and for this purpose it is equipped with a bearing block L for the grab handle G. The bearing block L could be omitted; in that case the device B is only used for fastening the accessory H. In place of the bearing block, the device could also have at least one other fastening device for other accessories, such as a sun visor, an armrest, a rearview mirror, lighting fixtures, screen and the like.

The device suitably is a one-piece plastic injection-molded element, for example made of polyamide, and suitably has an esthetically attractive or decorative visual side.

A closure flap 3 is pivotably connected to a frame-shaped base body 1 by means of a film hinge or a link 2 and supports a blocking wedge 4, whose purpose will be explained later. If necessary, the closure flap 3 with the blocking wedge 4 could also be a separate, shaped plastic element or shaped metal element. A protruding flange area 5 is formed on the back of the base body 1 facing away from the visual side, which surrounds an insertion opening 20 in the base body 1 and is of a height which approximately corresponds to the thickness of the accessory H which is to be fastened by means of the device. A plate-shaped locking element V1 extends approximately vertically in respect to the plane of the base body 1 from the interior of the flange area 5 in an extension of an insertion opening edge. A further locking element V2 has been connected to the locking element V1 in a knee joint-like connecting area 6, which initially extends obliquely away from the connecting area 6 and then is brought back with a free end section 7 approximately parallel with the locking element V1. The free end section 7 is not connected with the base body 1, so that the two locking elements V1, V2 are resiliently movable in respect to each other in the connecting area 6, and in the connecting area of the locking element V1 with the base body 1 are resiliently movable in respect to the latter. At least one outwardly projecting support shoulder 27 is formed on the exterior of each locking element V1, V2. Fastening brackets 8 are provided in the flange area 5 at least on one side at a distance above the base body 1 and approximately parallel with it, which can project outward past the contour of the base body 1. Furthermore, cutting strips 32 are provided on the exterior in the flange area, extending approximately in the insertion direction.

Connecting elements 12 have been provided in pockets 13 on two opposite lateral areas in the flange area 5, on which rod-shaped fastening elements F are supported by means of film hinges 11 in such a way that they are movable in planes approximately vertical in relation to the base body 1 between an insertion position indicated in FIG. 1 and a fastening position indicated in FIG. 2. The fastening elements F are fastening tongues 9, whose end sections 22 can project in the fastening position outward past the contour of the base body 1.

On the locking element V2, which is not directly connected with the base body 1, at least one outward protruding engagement element 18 is formed, for whose engagement with the base body 1, or respectively the flange area 5, a counter-engagement element 19, suitably embodied as a receiving pocket, is provided. Suitably, the engagement element 18 is a hook at the free end section 7 of the locking element V2, which can be inserted into the receiving pocket in order to couple the base body 1 with the locking element V2 in the extraction direction. These two components constitute a detent mechanism M, which suitably can be actuated by means of the blocking wedge 4 as soon as the latter is driven from below through the insertion opening 20 into the base body in order to secure the two locking elements V1, V2.

A connecting device E is furthermore provided between each fastening tongue 9 and the base body 1, which suitably operates interlockingly and/or in a frictionally connected manner and permits the fastening of the fastening tongue 9 in the fastening position. The connecting device E consists of a plier like clip 17, for example on the underside of the fastening tongue 9, and of a thickened pin 16, oriented toward it, in a pocket 13, open at the top, of the flange area 5. These components constitute the interlocking and/or frictionally connected connecting elements 14, 15 of the device B. If not needed, the connecting device E and the fastening tongues 9 can also be omitted.

The accessory H has a visible side S and a rear R, as well as a recess 31 for inserting the device B. For pre-mounting of the device B on the accessory H prior to the mounting of the latter on the vehicle support structure K (in the body sheet metal with a cutout 21), the base body 1 (with or without the grab handle G) is inserted from the visible side S with the flange area 5, the locking elements V1, V2 and the fastening tongues 9, which are in the insertion position, into the recess 31 until the base body 1 rests against the visible side S. The fastening tongues 8, being slightly inclined, are tilted over the rear R before the fastening tongues 9 are subsequently pivoted around their film hinges 11 into the fastening position, in which their free ends 22 also rest against the rear R. During this movement of the fastening tongues 9 the connecting devices E are actuated for fixing the fastening tongues 9 in place in the fastening position. The thickened pin 10 enters the mouth of the plier-like clip 17 and holds the fastening tongue 9 in place. In this way the device is premounted on the accessory H and is positioned, and cannot fall off by itself anymore (FIG. 2). The cutting strips 32, if provided, can engage the edge of the recess 31 in order to improve the positioning of the device B. So far the blocking wedge 4 has not yet been introduced into the insertion opening 20.

In a further mounting step, the accessory H is now to be fixed in place on the vehicle support structure K by means of the device B. To this end, the locking elements V1, V2 are pushed through the cutout 21 until the tops of the fastening brackets 8 and the fastening tongues 9, as well as the flange area 5, rest against the underside of the support structure K. During passage through the cutout 21 the locking elements V1, V2 are resiliently moved toward each other and in relation to the base body, until finally the support shoulders 27 extend behind the edges of the cutout 21 because of the resilient restoring forces. In order to assure the engagement of the locking elements V1, V2, or respectively to force them into their final mounting position, the blocking wedge 4 is driven through the insertion opening 20 between the locking elements V1, V2, until finally the closure flap 3 closes the insertion opening (and is fixed in place by detent elements, not represented, on the closure flap 3 and/or the blocking wedge 4).

The above mentioned steps must be performed in the reverse order for disassembly.

Figure 3:
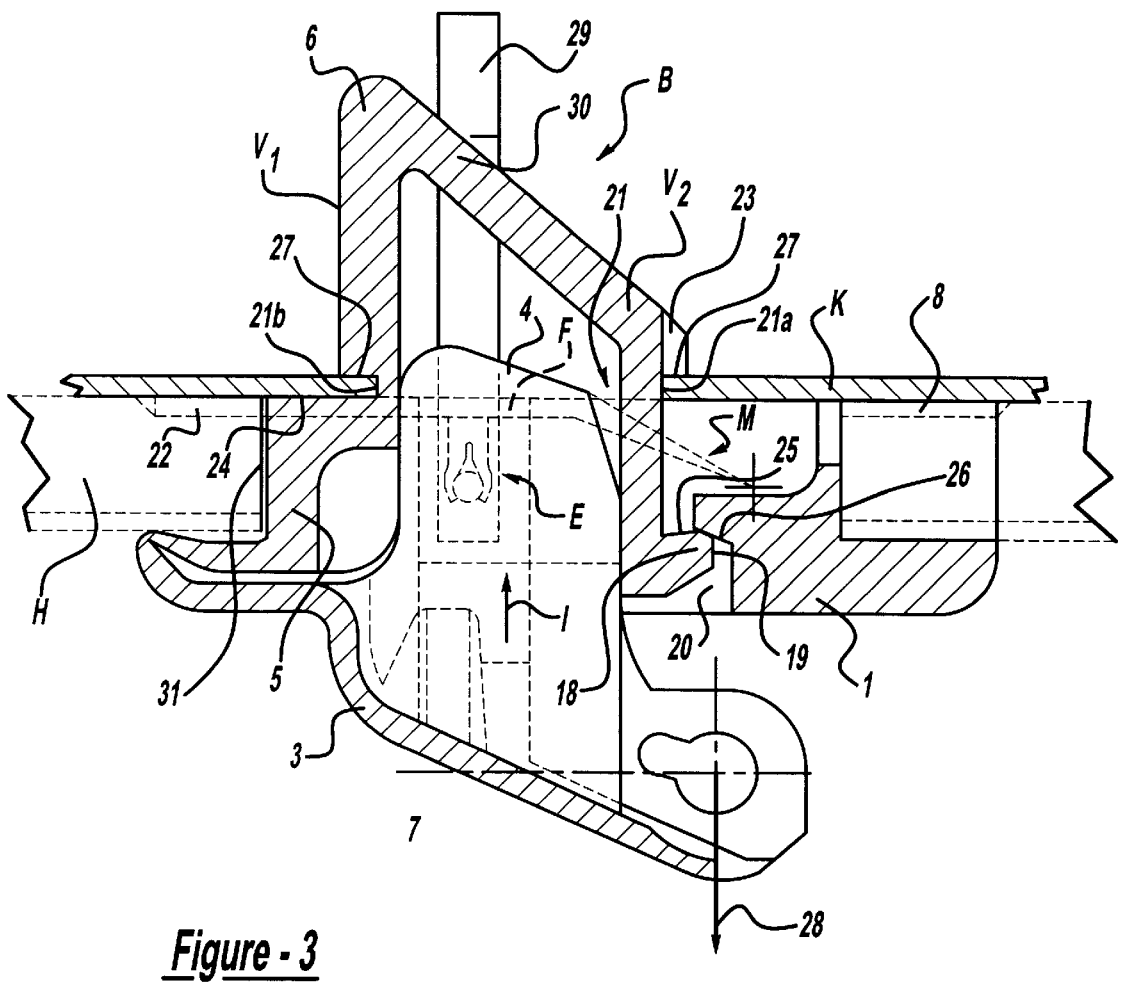
FIG. 3 represents a further embodiment of such a device in cross-sectional view after final mounting.

The function and structure of the device B in FIG. 3 is similar to the device B in FIGS. 1 and 2. It is represented in the final mounting position, in which the accessory H is fixed in place on the support structure K and the locking elements V1, V2 have been secured and extend behind the cutout edges 21b and 21a of the cutout 21 with their support shoulders 27. By closing the closure flap 3, the blocking wedge 4 has been driven between the locking elements V1, V2 on the base body 1 in such a way that the detent mechanism M has been actuated and couples the base body 1, fixed against tension, oppositely to the insertion direction R with the free end section 7 of the locking element V2. Again, the detent mechanism is constituted by the engagement element 18, designed as a protruding hook, which has been pressed into the pocket, which is open in the direction toward the visible side of the base body 1 and defines the counter-engagement element 19. A inclined tightening surface 26 is formed in the counter-engagement element 19, which presses the flange area 5 under prestress against the support structure K. The engagement element 18 can have an undercut surface 25 or also an inclined tightening surface. One contact surface of the flange area is shown at 24. The two locking elements V1, V2 have been spread apart in the connecting area 6 by the blocking wedge 4. The support shoulder 27 at the locking element V2 is delimited by at least one outward projecting protrusion 23.

Different from FIGS. 1 and 2, respectively one tongue 29 has been formed on both sides of the locking element V2, which extends vertically in the view in FIG. 3, and which extends with its lower end as far as the insertion opening 20. Viewed in the direction of the drawing plane, the tongues 29, which are connected with the locking element V2 at 30, diverge downwardly.

The detent mechanism M, shown in dashed lines in FIGS. 1 and 2, could be omitted, for example in case the device is exclusively destined for fixing the accessory H in place on the support structure K and therefore is not subjected to loads worth mentioning.

The device B in accordance with FIG. 3 can be equipped with the fastening brackets 8 and the fastening tongues F (indicated by dashed lines) which, in the fastened position, rest on the accessory H with their free ends 22 in order to fix the device B on the accessory H during pre-mounting. The fastening tongues F and the fastening brackets 8 do not necessarily have to be provided. If fastening tongues F are provided, the connecting device E is also there, which makes it possible to connect the fastening tongues F in their fastened position with the base body in an interlocked and/or frictionally connected manner as soon as the flange area 5 has been inserted into the recess 31 of the accessory H. The bearing block L is also formed on the base body, but it can also be omitted if desired.

If, in the final mounting position in FIG. 3, a force acts via the bearing block L in the direction of an arrow 28, this force is transferred to both cutout edges 21a, 21b, since the locking element V1 is directly connected with the base body 1, and the locking element V2 is connected in this force direction with the base body 1 by the actuation of the detent mechanism M.

Of course, it should be understood that changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

What is claim is:

1. A device for the screwless mounting of at least one accessory having a recess onto a vehicle support structure having a cutout for mounting the accessory, the device comprising a locking element, at least one base body, at least one connecting device, and a fastening element that can be moved between an insertion position and a fastening position, said fastening element including a fastening tongue and a hinge, said fastening tongue being moveable via said hinge into said fastening position, said fastening position being approximately parallel with said base body, said connecting device being arranged spaced apart from said hinge, wherein in the insertion position the locking element and the fastening element can be pushed through the recess of the accessory until the base body rests against a first side of the accessory, and in the fastening position the fastening element can be brought to rest against a second side of the accessory in order to fix the device in place on the accessory, and wherein the connecting device is provided between the fastening element and the base body for the selective fixation of the fastening element in the fastened position.

2. The device in accordance with claim 1, wherein the connecting device comprises a first connecting element on the fastening element, and a second connecting element on the base body wherein the first and second connecting elements are matched to each other.

3. The device in accordance with claim 1 wherein one of the first and second connecting elements is a thickened pin and the other connecting element is a clip.

4. The device in accordance with claim 3 wherein the first connecting element is a clip.

5. The device in accordance with claim 1 further comprising a flange area having a pocket which fits into the recess, the flange area being provided on a rear surface of the base body, and a fastening tongue respectively hinged on two oppositely located lateral areas of the flange area wherein a second connecting element is provided in the pocket of the flange area on the base body.

6. The device in accordance with claim 5, wherein in the fastening position a free end of the fastening tongue projects past the flange area, and on a side of the flange area located opposite the free end of the fastening tongue, at least one fastening bracket, which is approximately parallel with the base body, is spaced apart from the base body and is fixed in place and projects past the flange area.

7. The device in accordance with claim 6, wherein at least one cutting strip is provided between the fastening bracket and the base body.

8. The device in accordance with claim 3 wherein the hinge is substantially the same distance away from the base body as the connecting device, and that the fastening tongue has an essentially straight section and a tapered end section adjacent the hinge.

9. The device in accordance with claim 1, wherein the locking element has a free end section separated from the base body, and a detent mechanism is provided between the free end section of the locking element and the base body, by means of which the base body can be coupled in a tension-resistant manner opposite to an insertion direction of the locking element when the device has been mounted on the vehicle support structure.

10. The device in accordance with claim 9, wherein the locking element can be locked on the vehicle support structure by means of a blocking wedge, and the detent mechanism can be actuated by means of the blocking wedge.

11. The device in accordance with claim 9, wherein the connecting device between the fastening element and the base body, and the detent mechanism between the locking element and the base body, are provided on different sides of the base body.

12. The device in accordance with claim 1 wherein the device is integrally formed as a one-piece injection-molded plastic part.

13. The device in accordance with claim 12, wherein a first accessory, embodied as a headliner or a trim plate, as well as at least one further accessory, embodied as a grab handle, can be fixed in place on the body sheet metal constituting the vehicle support structure by means of the device, and that the device can be fastened with or without the further accessory on the accessory before the latter is finally mounted.

14. The device in accordance with claim 1 wherein a first accessory, embodied as a headliner or a trim plate, can be fixed in place on the body sheet metal constituting the vehicle support structure by means of the device, and the device can be fastened on the accessory before the latter is finally mounted.

15. The device in accordance with claim 1 wherein a bearing block for a grab handle is provided on the visible side of the base body.

16. A device for the screwless mounting of at least one accessory having a recess onto a vehicle support structure having a cutout for mounting the accessory, the device comprising a locking element, at least one base body, at least one connecting device, a fastening element that can be moved between an insertion position and a fastening position, a flange area having a pocket positionable within the recess, said flange area being provided on a rear surface of said at least one base body, a second connecting element being provided in said pocket of said flange area, and a fastening tongue respectively hinged on two oppositely located lateral areas of said flange area, wherein in the insertion position the locking element and the fastening element can be pushed through the recess of the accessory until the base body rests against a first side of the accessory, and in the fastening position the fastening element can be brought to rest against a second side of the accessory in order to fix the device in place on the accessory, and wherein the connecting device is provided between the fastening element and the base body for the selective fixation of the fastening element in the fastened position.

17. The device in accordance with claim 16 wherein a bearing block for a grab handle is provided on a side of said at least one base body.

18. The device in accordance with claim 16 wherein said fastening element is a fastening tongue, which can be moved via a hinge into the fastening position that is approximately parallel with said at least one base body, and said at least one connecting device is arranged spaced apart from the hinge.

19. A device for the screwless mounting of at least one accessory having a recess onto a vehicle support structure having a cutout for mounting the accessory, the device comprising a locking element, at least one base body having a side, a bearing block for a grab handle being provided on said side of said at least one base body, at least one connecting device, and a fastening element that can be moved between an insertion position and a fastening position, wherein in the insertion position the locking element and the fastening element can be pushed through the recess of the accessory until the base body rests against a first side of the accessory, and in the fastening position the fastening element can be brought to rest against a second side of the accessory in order to fix the device in place on the accessory, and wherein the connecting device is provided between the fastening element and the base body for the selective fixation of the fastening element in the fastened position.

20. The device in accordance with claim 19 a further comprising a flange area having a pocket which fits into the recess, said flange area being provided on a rear surface of the base body, and a fastening tongue respectively hinged on two oppositely located lateral areas of said flange area wherein a second connecting element is provided in the pocket of the flange area on the base body.

* * * * *